(12) United States Patent
Potenza et al.

(10) Patent No.: US 7,056,375 B2
(45) Date of Patent: Jun. 6, 2006

(54) SOLUBILIZED DYES FOR INKS

(75) Inventors: Joan C. Potenza, Rush, NY (US); Marcel B. Madaras, Webster, NY (US); Hans F. Schmitthenner, Rush, NY (US); David T. Southby, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/935,599

(22) Filed: Sep. 7, 2004

(65) Prior Publication Data

US 2006/0048673 A1 Mar. 9, 2006

(51) Int. Cl.
*C09D 11/00* (2006.01)
*C09B 29/036* (2006.01)

(52) U.S. Cl. ............... 106/31.5; 106/31.48; 106/31.58; 534/752

(58) Field of Classification Search ............... 106/31.5, 106/31.48, 31.58; 534/752
See application file for complete search history.

(56) References Cited

U.S. PATENT DOCUMENTS

| | | | | |
|---|---|---|---|---|
| 5,306,814 | A | * | 4/1994 | Akahori et al. ............. 534/642 |
| 6,458,194 | B1 | * | 10/2002 | Mikoshiba et al. ........ 106/31.5 |
| 2005/0126431 | A1 | * | 6/2005 | Potenza et al. ............ 106/31.5 |

FOREIGN PATENT DOCUMENTS

| | | |
|---|---|---|
| BE | 635490 | 1/1964 |
| BE | 642347 | 5/1964 |
| DE | 1234891 | 2/1967 |
| EP | 0716931 B1 | 10/2001 |
| JP | 04089290 | 7/1990 |
| JP | 04292988 A2 | 10/1992 |
| JP | 1997 176502 | 7/1997 |
| JP | 3041725 B2 | 5/2000 |

OTHER PUBLICATIONS

"Filtration and Reciprocity Effects on the Fade Rate of Inkjet Photographic Prints" by D.E. Bugner and C. Suminski, IS&T's NIP16: International Conference on Digital Printing Technologies, Vancouver, BC, Oct. 2006.

* cited by examiner

*Primary Examiner*—Helene Klemanski
(74) *Attorney, Agent, or Firm*—Sarah Meeks Roberts

(57) ABSTRACT

This invention relates to an ink composition comprising a dye represented by Formula I:

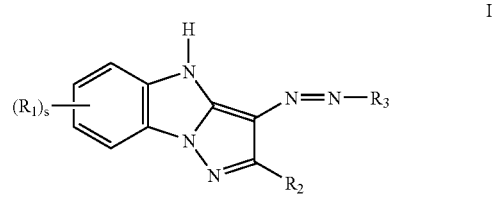

wherein
$R_1$ is independently a non-metallic substituent;
s is 0, 1, 2, 3, or 4;
$R_2$ is hydrogen or a non-metallic substituent;
$R_3$ is a substituted or unsubstituted aromatic or heterocyclic group with the proviso that if $R_3$ is a quinoline moiety, the azo group is not bonded to the 5, 6, 7 or 8 position of the quinoline ring; wherein the dye must bear at least one ionizable group that is capable of imparting water solubility to the dye. It also relates to dyes which comprise a specific subset of the above dyes.

16 Claims, No Drawings

SOLUBILIZED DYES FOR INKS

FIELD OF THE INVENTION

The present invention relates to new dyes and their use in inks, particularly ink jet inks.

BACKGROUND OF THE INVENTION

Ink jet printing is a non-impact method for producing images by the deposition of ink droplets in a pixel-by-pixel manner to an image-recording element in response to digital signals. There are various methods that may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant that is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic solvents and high boiling organic solvents, such as hydrocarbons, esters, ketones, etc.

Materials used in inkjet printing inks must have the correct properties to provide an ink which is stable, possesses good printing properties and provides an image with good color, sharpness and image stability. Many dyes are known and used in inkjet printing inks. Many have some or most of these desirable properties but it is very difficult to find a dye which possesses all of the above attributes. Ink jet inks generally contain a dye that is soluble in an ink vehicle such as water or a mixture composed of water and a known water soluble or water miscible organic solvent. Typically the dyes are chosen from acid, direct and reactive dyestuffs developed for the dyeing of natural fibers such as paper, wool and cotton. Water solubility of these dyes is due to the incorporation of negatively charged substituent groups such as sulfo or carboxy. Dyes are degraded by ozone and light and their stability with regard to these two agents can differ depending on media and ink composition. There is a great need to develop dye-based inks which have high optical densities on receivers and also superior lightfastness and colorfastness when printed on different types of media, in particular, fast drying or porous media as well as plain paper.

The yellow dyes currently in commercial aqueous ink formulations are less than optimal in one property or another. They are used because they achieve an acceptable but not superior balance of features. Some examples of such dyes are Direct yellow 132 (CAS 10114-86-0) and Direct yellow 86 (CAS 50295-42-3), which have good stability toward ozone and light but have less than optimal hue, acid yellow 23 (CAS 1934-21-0) and acid yellow 17 (CAS 6359-98-4) which have good hue and ozone fastness, but poor light stability. U.S. Pat. Nos. 6,468,338 and 6,464,767 disclose water-soluble azoindole dyes for use in ink jet printing including dyes derived from diazotizable heteroaromatic amines. However, there is a problem with some of these dyes in that they do not have sufficient stability to atmospheric ozone, especially on porous fast drying media. This property on porous media is important because such fast drying media is becoming more and more popular and while most dyes are stable on gel-based or swellable media, porous media are more stringent in their demand for a high level of stability.

While glossy, porous IRL's have the ability to absorb high concentrations of ink instantly, they suffer from image fastness problems, such as fading due to exposure to radiation by daylight, tungsten light, fluorescent light, or ozone, as described by D. E. Bugner and C. Suminski, "Filtration and Reciprocity Effects on the Fade Rate of Inkjet Photographic Prints", Proceedings of IS&T's NIP 16: International Conference on Digital Printing Technologies, Vancouver, BC, October 2000. It is believed that the poor image fastness may be attributed to the greater permeability of the porous IRL's to oxygen and/other airborne reactants such as ozone.

Problem to be Solved by the Invention

There remains a need to identify and select those dyes that are useful in producing a high quality image with good hue and improved light and ozone fastness. It would be most useful if these dyes performed well on porous media, swellable media and plain paper.

SUMMARY OF THE INVENTION

This invention provides an ink composition comprising a dye represented by Formula I:

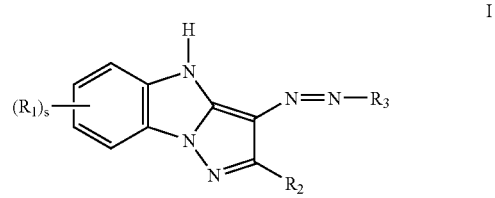

wherein
  $R_1$ is independently a non-metallic substituent;
  s is 0, 1, 2, 3, or 4;
  $R_2$ is hydrogen or a non-metallic substituent;
  $R_3$ is a substituted or unsubstituted aromatic or heterocyclic group with the proviso that if $R_3$ is a quinoline moiety, the azo group is not bonded to the 5,6,7 or 8 position of the quinoline ring; wherein the dye must bear at least one ionizable group that is capable of imparting water solubility to the dye.

This invention further provides a dye represented by Formula I

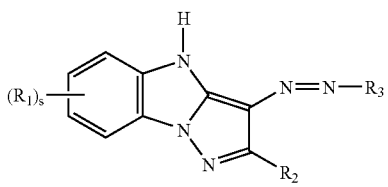

wherein
R₁ is independently a non-metallic substituent;
s is 0, 1, 2, 3, or 4;
R₂ is hydrogen or a non-metallic substituent;
R₃ is

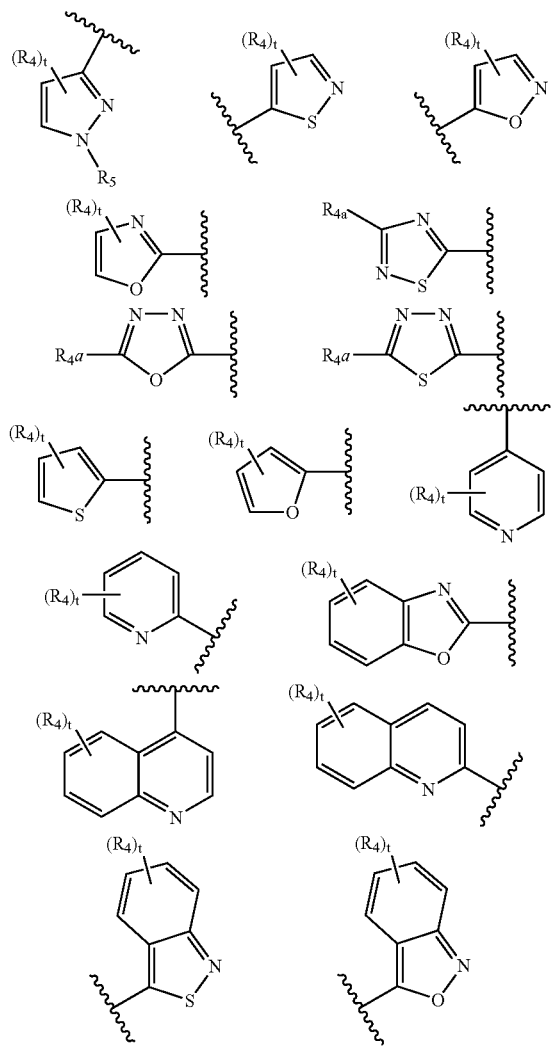

R₄ is independently a non-metallic substituent;
t is 0, 1, 2, 3 or 4;
R$_{4a}$ is hydrogen or a non-metallic substituent; and
R₅ is a hydrogen atom, a substituted or unsubstituted aryl, alkenyl, alkynyl or alkyl group, a sulfo group, a carboxyl or carboalkoxy group, a formyl group or a substituted acyl group; and the point of attachment to the nitrogen of the azo group is designated by:

with the proviso that the dye must bear at least one ionizable group that is capable of imparting water solubility.

The dyes and inks of the invention have numerous advantages such as good hue, and light fastness. The ink composition also has better fade resistance. The dyes of the present invention are easily synthesized by known methods, and have multiple advantages over known dye classes. The dyes of this invention have desirable hue when printed on both porous and gel-based media. The spectral curve of the dyes of this invention are broad but sharp cutting on the bathochromatic side of the spectral curve, and have no unwanted secondary absorbance. The broad nature of the spectral curve of particular yellow examples of this invention is an advantage because, when combined with broadly absorbing magenta and cyan colorants, it results in reduced variability in response under different or changing illuminant sources. This results in more consistently pleasing colors and improved color reproduction in photographic ink jet applications. It is possible, by varying the electronic nature of the substituents attached to the dyes of this invention, to produce azo dyes which range from lemon yellow to magenta in color. The dyes of this invention have superior light fastness and stability toward ozone compared with other dye classes, in particular when printed on porous silica or alumina based media. These and other advantages will be apparent from the detailed description below.

Full color ink jet printing normally employs a set of at least three primary inks—cyan, magenta and yellow. In addition, black, orange, red, blue and green inks and lower strength formulations of the primary inks may be used to provide improved image quality. Inks containing the yellow dyes of this invention may be used in combination with inks containing other dyes and pigments useful for ink jet printing.

DETAILED DESCRIPTION OF THE INVENTION

The inks of the invention comprise a dye is represented by general Formula I:

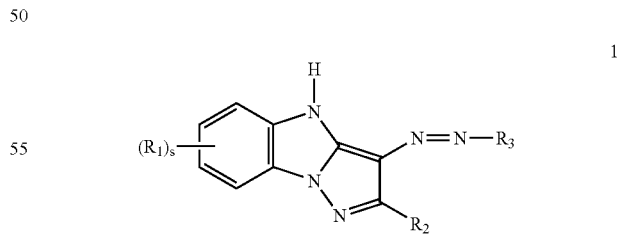

wherein R₁ may be any non-metallic substituent. R₁ may be bonded to any position or positions of the carbocyclic ring. s is 0, 1, 2, 3 or 4. Preferably R₁, when present, may be a halogen atom, a cyano group, a substituted or unsubstituted alkyl group, an alkoxy group, an aryloxy group, a primary, secondary or tertiary amino or amido group, an aromatic amino group, an acyloxy group, a cycloalkyl group, an alkenyl group, an aralkyl group, a substituted or unsubstituted aryl group, a carboxyl or substituted carboxyl group, an alkylthio group, an arylthio group, an acyl group, a substituted acyl group, a carbamoyl group, a nitro group, an alkyl or aryl sulfone, a sulfonic acid, a sulfonate group, a substituted or unsubstituted primary or secondary alkyl sulfonamide, a substituted or unsubstituted aryl sulfonamide, a sulfamoyl group, a secondary or tertiary amine or a heterocyclic group;

$R_2$ may be a hydrogen or any non-metallic substituent. Preferably $R_2$ may be a hydrogen atom, a halogen atom, a cyano group, a substituted or unsubstituted alkyl group, an alkoxy group, an aryloxy group, a primary, secondary or tertiary amino or amido group, an aromatic amino group, an acyloxy group, a cycloalkyl group, an alkenyl group, an aralkyl group, a substituted or unsubstituted aryl group, a carboxyl or substituted carboxyl group, an alkylthio group, an arylthio group an acyl group, a substituted acyl group, a carbamoyl group, a nitro group, an alkyl or aryl sulfone, a sulfonic acid, a sulfonate group, a substituted or unsubstituted primary or secondary alkyl sulfonamide, a substituted or unsubstituted aryl sulfonamide, a sulfamoyl group, a secondary or tertiary amine or a heterocyclic group.

$R_3$ may be any substituted or unsubstituted aromatic or heterocyclic group with the proviso that if $R_3$ is a quinoline moiety, the azo group is not bonded to the 5, 6, 7 or 8 position of the quinoline ring. In one embodiment $R_3$ may be any substituted or unsubstituted aromatic carbocycle, or any heterocyclic moiety (monocyclic or fused or unfused polycyclic) in which the azo group is bonded to a ring that contains at least one heteroatom. In a preferred embodiment of the invention, the inks of this invention contain a dye of Formula I in which $R_3$ is preferably a heterocyclic ring chosen from group 1 below, and the point of attachment to the nitrogen of the azo group is designated by:

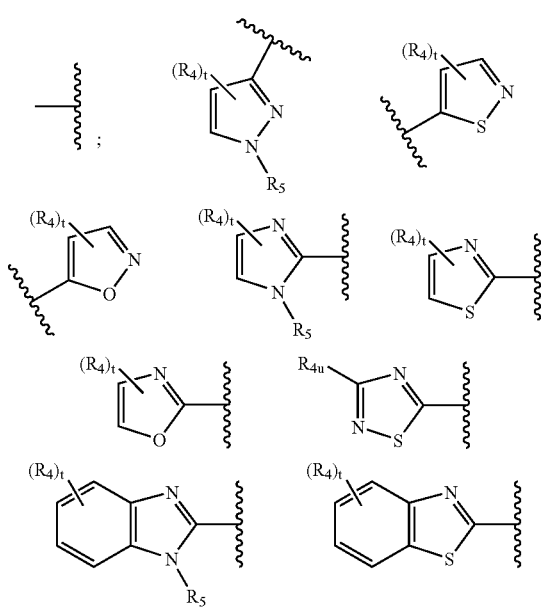

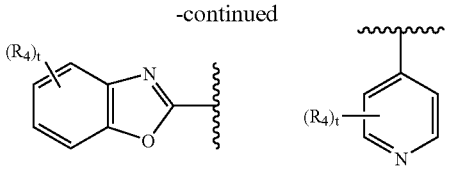

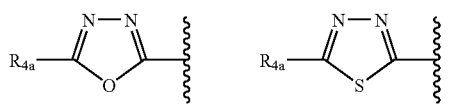

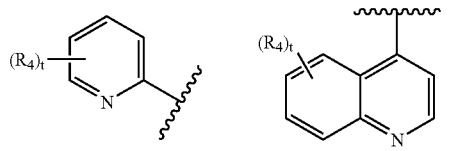

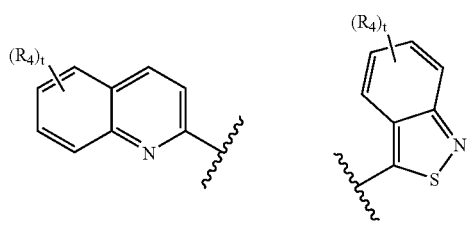

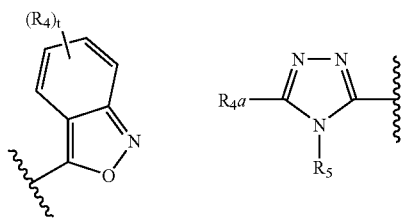

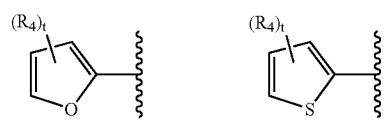

in which $R_4$ is independently a non-metallic substituent. $R_4$ may be present in any position or positions of the ring. t is 0, 1, 2, 3 or 4. $R_{4a}$ is hydrogen or a non-metallic substituent. $R_5$ is a hydrogen atom, a substituted or unsubstituted aryl, alkenyl, alkynyl or alkyl group, a sulfo group, a carboxyl or carboalkoxy group, a formyl group or a substituted acyl group. The point of attachment to the nitrogen of the azo group is designated by:

The dye must bear at least one ionizable group that is capable of imparting water solubility to the dye. The dyes of the present invention must have adequate water solubility to enable preparation of an ink formulation containing between 0.2 and 10% dye.

In a most preferred embodiment of the invention, the ink may contain a dye of Formula II

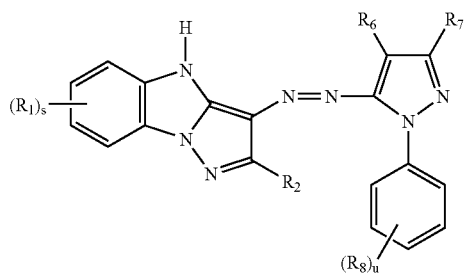

II $R_6$ and $R_7$ are independently a hydrogen atom or any non-metallic group. Preferably $R_6$ is a carboxyl, nitro, halogen, sulfonyl, sulfo, acyl, substituted acyl, cyano, or a heterocyclic group. Preferably $R_7$ is a hydrogen atom, or a substituted or unsubstituted alkyl, aryl, alkenyl or alkynyl group. $R_8$ is independently a non-metallic substituent and may be present in any position or positions of the aromatic ring. u is 0, 1, 2, 3 or 4. At least one of $R_1$–$R_8$ must be an ionizable group capable of imparting water solubility to the dye. In a preferred embodiment $R_8$ is an ionizable group, some examples of which are: carboxy, sulfoxy, or hydroxy, and the group may be protonated or present in its ionized form as a salt, and associated with any positive counterion.

Unless otherwise specifically stated, use of the term "substituted" or "substituent" means any group or atom other than hydrogen. Additionally, unless specifically stated otherwise, whenever a substituent comprises a substitutable hydrogen, it is intended that the substituent encompasses not only the substituent's unsubstituted form, but also its form further substituted with any substituent group or groups as herein mentioned, so long as the substituent group does not destroy properties necessary ink jet utility. Suitably, a substituent group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecylphenylcarbonylamino, p-tolylcarbonylamino, N-methylureido, N,N-dimethylureido, N-methyl-N-dodecylureido, N-hexadecylureido, N,N-dioctadecylureido, N,N-dioctyl- N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy) acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1-(N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituent groups may themselves be further substituted one or more times with the described substituent groups. The particular substituents used may be selected by those skilled in the art to attain the desired dye properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

Below are examples of dyes used in the invention. The dyes in the present invention include but are not limited to these examples. The dyes are shown with acidic groups in protonated form but any ionized form associated with a positive counterion of any type may be included:

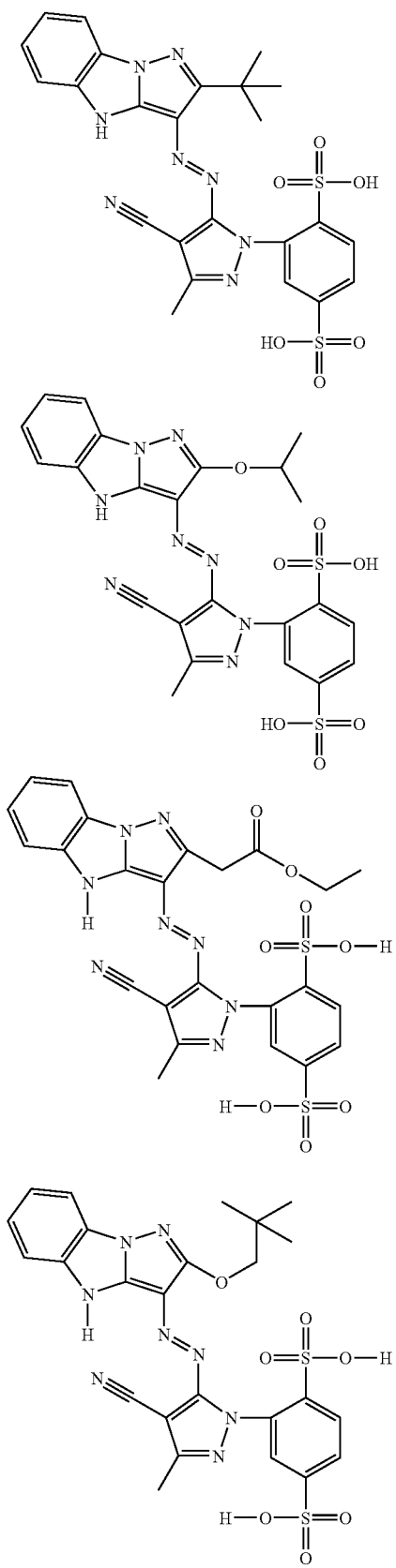
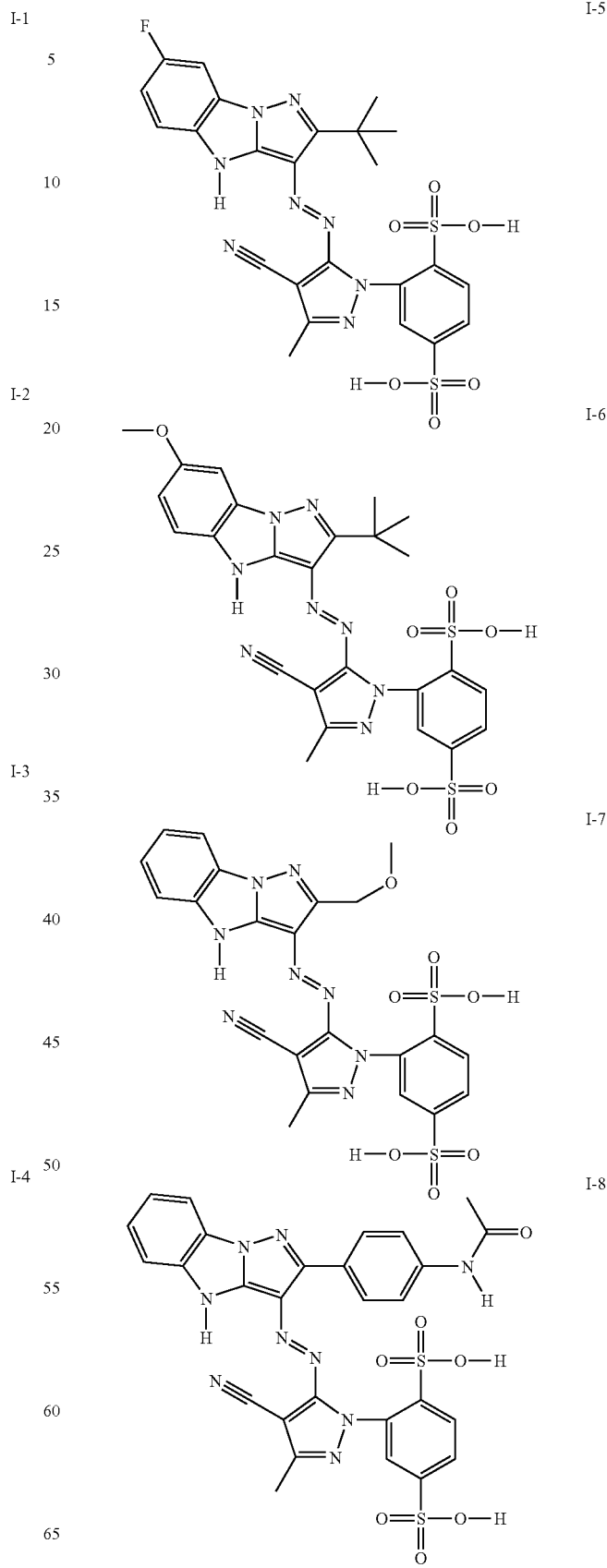

-continued
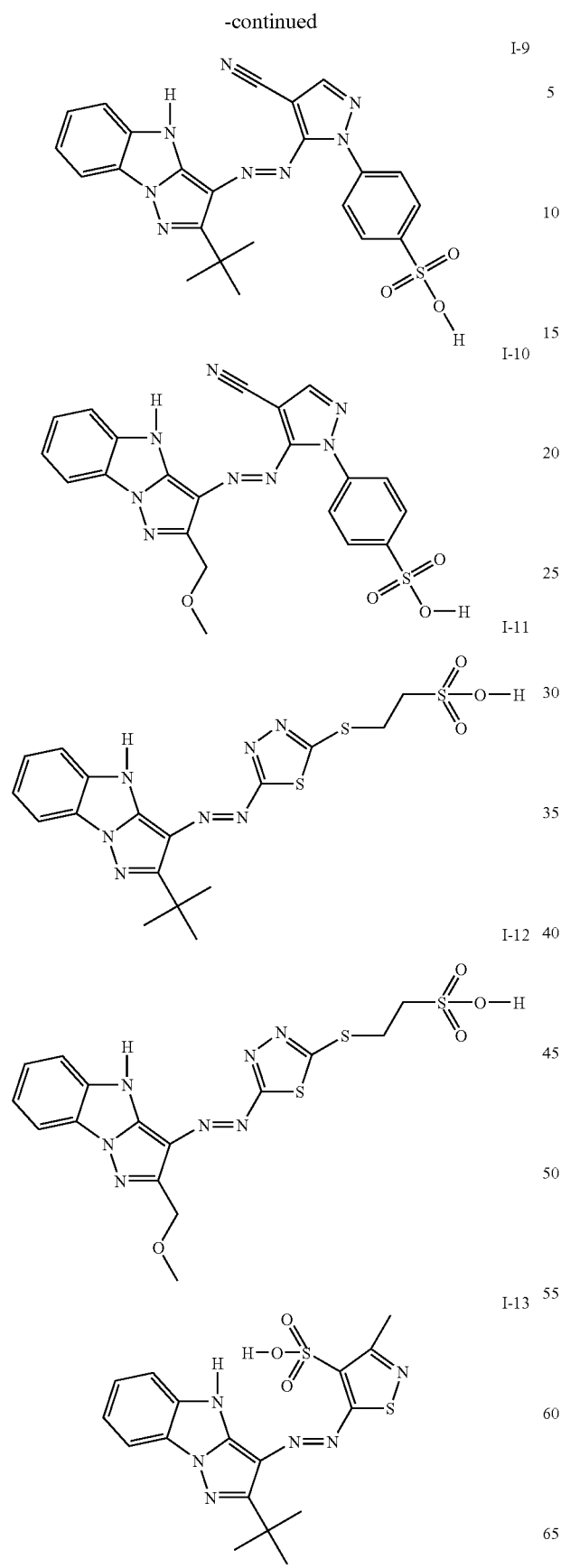
I-9
I-10
I-11
I-12
I-13
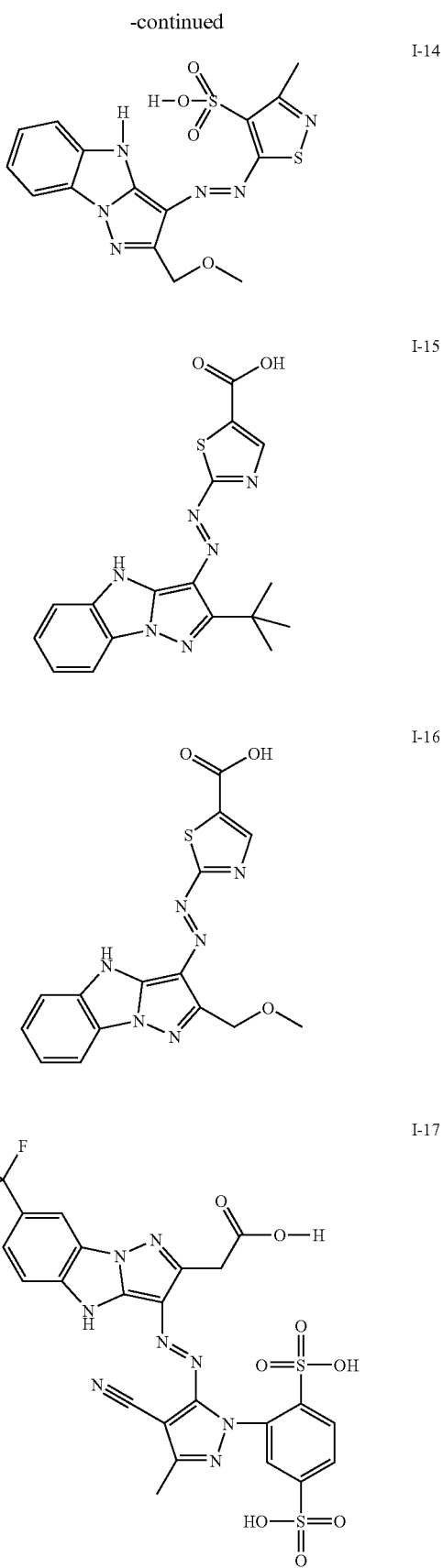
I-14
I-15
I-16
I-17

-continued
I-18
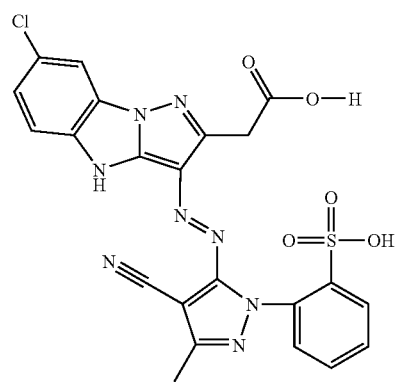
I-19
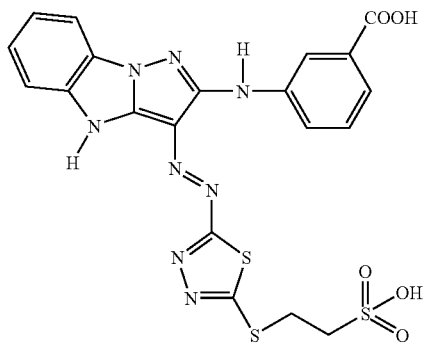
I-20
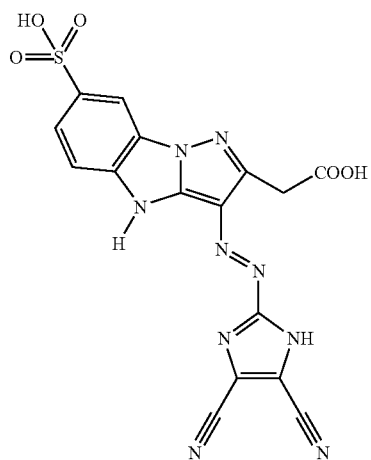
I-21
-continued
I-22
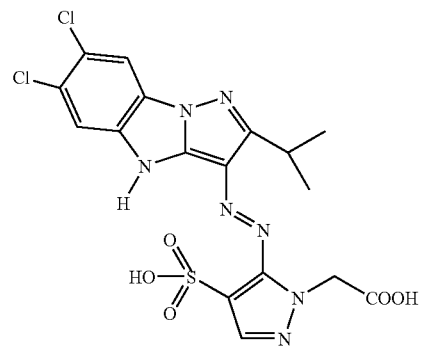
I-23
I-24
I-25
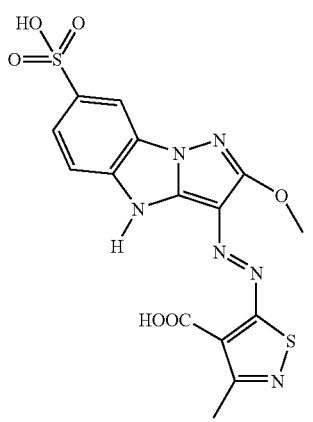

-continued
I-27
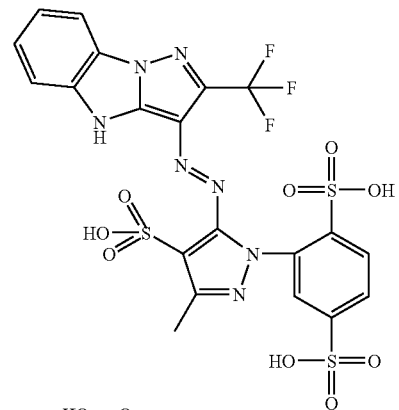
I-28
I-29
I-30
I-31
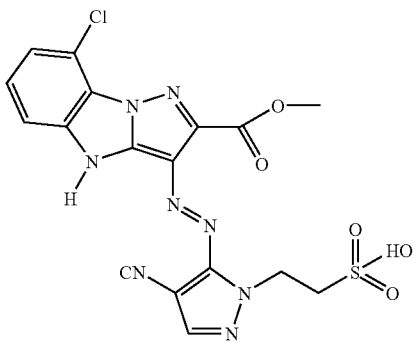
I-32
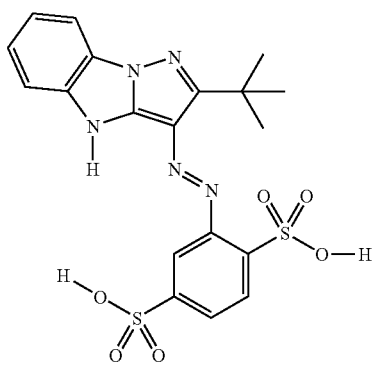
I-33
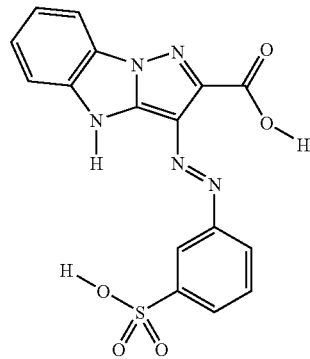
I-34
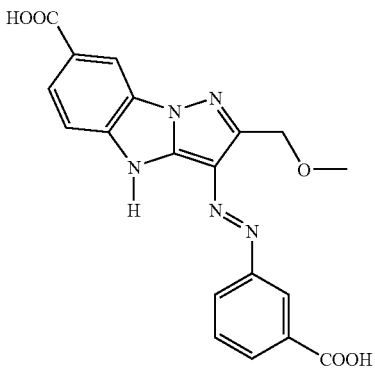

-continued

I-35

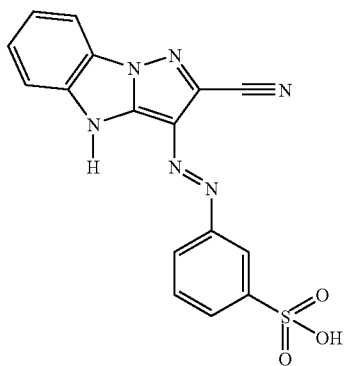

I-36

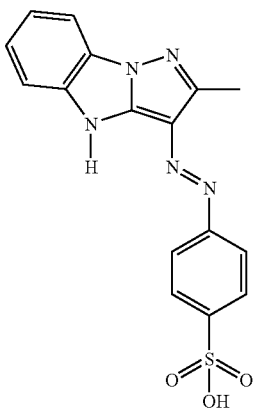

I-37

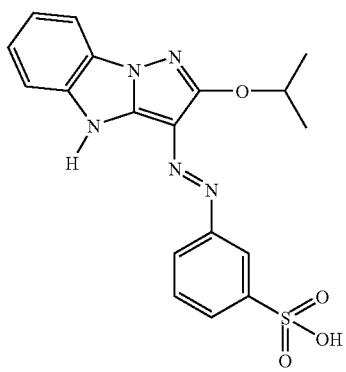

I-38

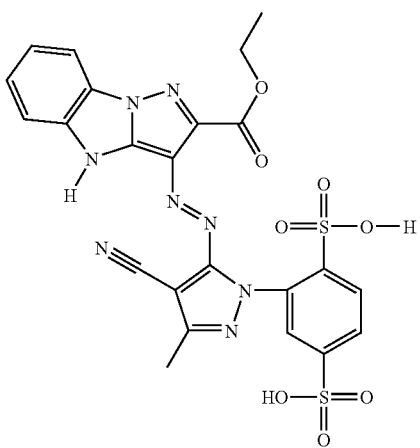

-continued

I-39

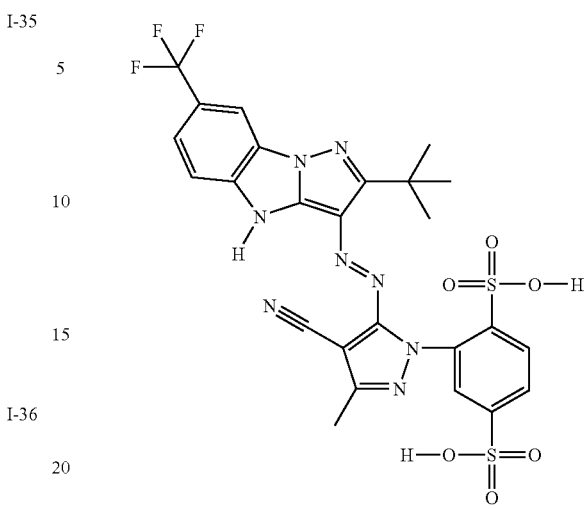

The ink of the invention may be utilized in any ink printing process. Although preferred for ink jet use, it also could be used for any printing or writing process using ink. Typical of such processes are pen plotters and pens. In general, the above dyes comprise from about 0.2 to about 8%, preferably from about 1 to about 5% by weight of the ink jet ink composition.

A humectant preferably is employed in the ink jet composition of the invention to help prevent the ink from drying out or crusting in the orifices of the printhead. Examples of humectants which can be used include polyhydric alcohols, such as ethylene glycol, diethylene glycol (DEG), triethylene glycol, propylene glycol, tetraethylene glycol, polyethylene glycol, glycerol, 1,5 pentanediol, 1,2-hexanediol, 2-ethyl-2-hydroxymethyl-1,3-propanediol (EHMP) 2-methyl-2,4-pentanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl ether or mono-butyl ether (TEGMBE), poly(ethylene glycol) monobutyl ether (PEGMBE), diethylene glycol di-methyl or di-ethyl ether, and diethylene glycol monobutylether; nitrogen-containing cyclic compounds, such as pyrrolidone, N-methyl-2-pyrrolidone, 1,3-dimethyl-2-imidazolidinone and urea; and sulfur-containing compounds such as dimethyl sulfoxide and tetramethylene sulfone. Preferred humectants for the inks of the invention include DEG, glycerol, DEGMBE, TEGMBE, 1,2-hexanediol, 1,5-pentanediol, urea, pyrrolidin-2-one, EHMP and mixtures thereof, because inks prepared with these humectants provide the best balance of physical properties. The humectant may be employed in each ink in an amount of from about 5 to about 60 weight percent of water miscible organic solvent. Percentages are based on the total weight of the aqueous carrier.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic. Preferred surfactants include Surfynol® 465 (available from Air Products Corp.) and Tergitol® 15-S-5 (available from Union Carbide) because inks prepared with these surfactants provide the best balance of physical properties.

A biocide may be added to the composition of the invention to suppress the growth of micro-organisms such as molds, fungi, etc. in aqueous inks. A preferred biocide for the ink composition of the present invention is Proxel® GXL (Zeneca Specialties Co.) at a final concentration of 0.0001–0.5 wt. %.

The pH of the aqueous ink compositions of the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethylenediamine.

Inks containing the yellow dyes of this invention may be used in combination with inks containing other dyes and pigments useful for ink jet printing. Dyes useful for ink jet printing are normally water soluble dyes of the Acid, Direct, Reactive or Basic Color Index classifications. Typical cyan dyes may be copper phthalocyanine derivatives such as Direct Blue 199 and 86; triarylmethane dyes such as Acid Blue 9; azo, metal-complex azo, metal-complex formazan or anthraquinone dyes. Typical magenta dyes may be xanthene dyes such as Acid Red 52; azo-naphthol dyes such as Acid Red 249, Direct Red 227 or Reactive Red 31; azo-aniline dyes; azo-thiazole dyes; arylazonaphthylamine dyes such as Direct Red 75 or Ilford M-377; metal-complex azo dyes such as Reactive Red 23, CAS Registry No. 347417-99-6 or any of the dyes described in US 6001161; anthrapyridone dyes such as Acid Red 80 and 82; or anthraquinone dyes. Typical black dyes that are useful for ink jet printing include polyazo dyes such as Food Black 2, Direct Black 22 or Direct Black 19: metal-complex polyazo dyes such as Reactive Black 31, Pacified Reactive Black 31 or Ilford K-1334; sulfur black dyes or aniline black dyes. The yellow dyes of this invention may also be mixed with other yellow dyes useful for ink jet printing such as Acid Yellow 17 or 23, Direct Yellow 86 or 132 or Ilford Y 307, etc. The yellow dyes of this invention may also be used in combination with pigmented ink jet inks. Typical pigments useful for ink jet printing include carbon black, metal phthalocyanines, diketopyrrolopyrroles, quinacridones, anthraquinones, perylenes, azo and disazo derivatives.

A typical ink composition of the invention comprises, for example, the following constituents by weight: colorant (0.2–8%), water (20–95%), a humectant (5–70%), water miscible solvents (2–20%), surfactant (0.1–10%), biocide (0.05–5%) and pH control agents (0.1–10%).

Additional additives which may optionally be present in the ink jet ink composition of the invention include thickeners, conductivity enhancing agents, anti-kogation agents, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer. The inks are suitable for use with any of the common ink jet heads for ejecting ink droplets.

The inks of the invention may be used with any ink jet receiver substrate. Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1. The inks may be used with plain paper as well as other receivers.

An ink jet recording element typically comprises a support having on at least one surface thereof an ink-receiving or image-receiving layer, and includes those intended for reflection viewing, which have an opaque support, and those intended for viewing by transmitted light, which have a transparent support.

In addition to plain paper, there are generally two types of ink-receiving layers (IRL's). The first type of IRL comprises a non-porous coating of a polymer with a high capacity for swelling and absorbing ink by molecular diffusion. Cationic or anionic substances are added to the coating to serve as a dye fixing agent or mordant for the cationic or anionic dye. This coating is optically transparent and very smooth, leading to a high glossy "photo-grade" receiver. The second type of IRL comprises a porous coating of inorganic, polymeric, or organic-inorganic composite particles, a polymeric binder, and additives such as dye-fixing agents or mordants. These particles can vary in chemical composition, size, shape, and intra-particle porosity. In this case, the printing liquid is absorbed into the open pores of the IRL to obtain a print which is instantaneously dry to the touch.

The inks of the invention may be particularly useful with porous receivers. An important characteristic of ink jet recording elements is their need to dry quickly after printing. To this end, porous recording elements provide nearly instantaneous drying as long as they have sufficient thickness and pore volume to effectively contain the liquid ink.

A glossy, porous IRL usually contains a base layer and a glossy image-receiving layer. When coated on plain paper, the base layer is laid down underneath the glossy image-receiving layer. In order to provide a smooth, glossy surface on the image-receiving layer, special coating processes are often utilized, such as cast coating and film transfer coating. For example, a porous recording element can be manufactured by cast coating, in which the particulate-containing coating is applied to a support and is dried in contact with a polished smooth surface. Calendering with heat and pressure is also used in combination with conventional blade, rod or air-knife coating on plain paper to produce gloss on the image-receiving layer.

In one embodiment, the dyes of the invention, which may be used in other applications as well as ink jet inks, are represented by Formula I

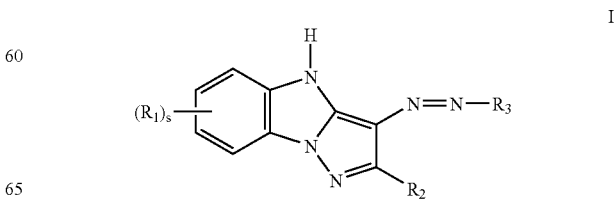

wherein $R_1$ is independently a non-metallic substituent and s is 0, 1, 2, 3, or 4. $R_2$ is hydrogen or a non-metallic substituent.

$R_1$ may be bonded to any position or positions of the carbocyclic ring. Preferably $R_1$, when present, may be a halogen atom, a cyano group, a substituted or unsubstituted alkyl group, an alkoxy group, an aryloxy group, a primary, secondary or tertiary amino or amido group, an aromatic amino group, an acyloxy group, a cycloalkyl group, an alkenyl group, an aralkyl group, a substituted or unsubstituted aryl group, a carboxyl or substituted carboxyl group, an alkylthio group, an arylthio group, an acyl group, a substituted acyl group, a carbamoyl group, a nitro group, an alkyl or aryl sulfone, a sulfonic acid, a sulfonate group, a substituted or unsubstituted primary or secondary alkyl sulfonamide, a substituted or unsubstituted aryl sulfonamide, a sulfamoyl group, a secondary or tertiary amine or a heterocyclic group;

$R_2$ may be a hydrogen or any non-metallic substituent. Preferably $R_2$ may be a hydrogen atom, a halogen atom, a cyano group, a substituted or unsubstituted alkyl group, an alkoxy group, an aryloxy group, a primary, secondary or tertiary amino or amido group, an aromatic amino group, an acyloxy group, a cycloalkyl group, an alkenyl group, an aralkyl group, a substituted or unsubstituted aryl group, a carboxyl or substituted carboxyl group, an alkylthio group, an arylthio group, an acyl group, a substituted acyl group, a carbamoyl group, a nitro group, an alkyl or aryl sulfone, a sulfonic acid, a sulfonate group, a substituted or unsubstituted primary or secondary alkyl sulfonamide, a substituted or unsubstituted aryl sulfonamide, a sulfamoyl group, a secondary or tertiary amine or a heterocyclic group;

$R_3$ is

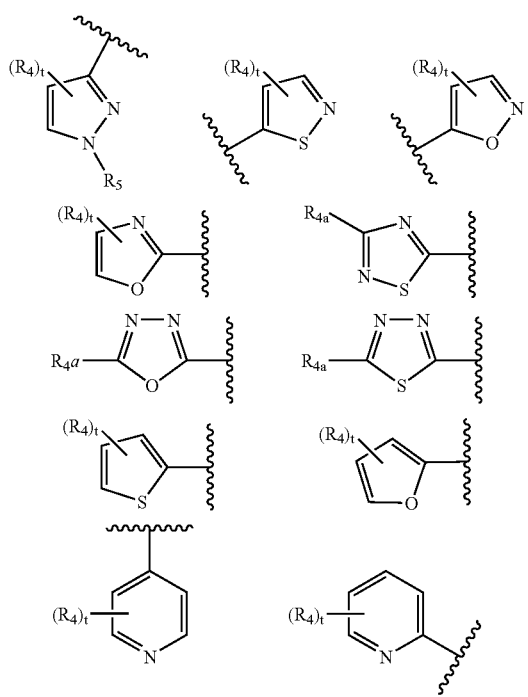

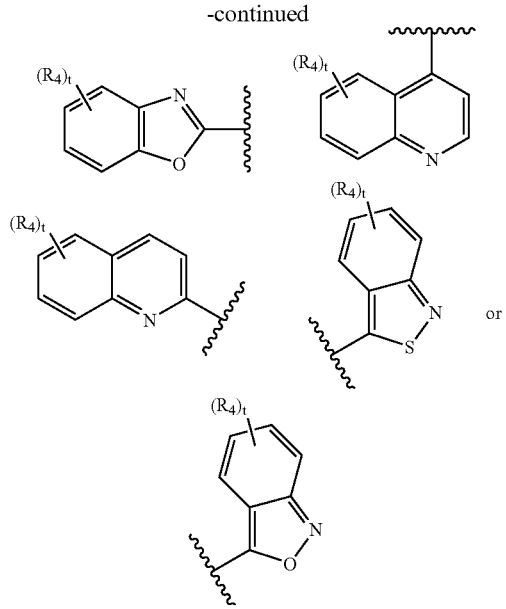

wherein $R_4$ is independently a non-metallic substituent and t is 0, 1, 2, 3 or 4. $R_{4a}$ is hydrogen or a non-metallic substituent; and $R_5$ is a hydrogen atom, a substituted or unsubstituted aryl, alkenyl, alkynyl or alkyl group, a sulfo group, a carboxyl or carboalkoxy group, a formyl group or a substituted acyl group. The point of attachment to the nitrogen of the azo group is designated by:

The dye must bear at least one ionizable group that is capable of imparting water solubility.

In a more preferred embodiment the dyes may be represented by Formula IA:

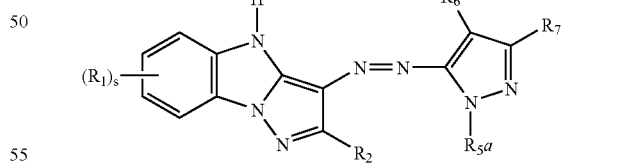

$R_1$ and $R_2$ are as defined above. $R_{5a}$ is a hydrogen atom, a substituted or unsubstituted aryl, alkenyl, alkynyl or alkyl group, a sulfo group, a carboxyl or carboalkoxy group, a formyl group or a substituted acyl group. $R_6$ and $R_7$ are independently a hydrogen atom or any non-metallic substituent; with the proviso that at least one of $R_1$–$R_7$ must be an ionizable group capable of imparting water solubility to the dye.

In a more preferred embodiment the dyes are represented by Formula II:

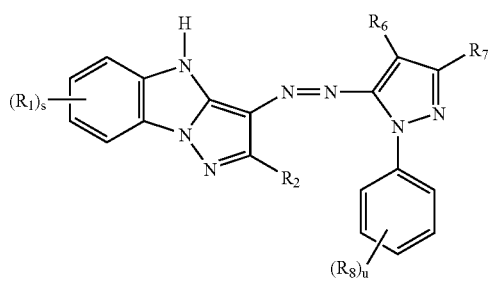

R$_1$ and R$_2$ are as defined above. R$_6$ is a carboxyl, nitro, halogen, sulfonyl, sulfo, acyl, substituted acyl, cyano, or a heterocyclic group. R$_7$ is a substituted or unsubstituted alkyl, aryl, alkenyl or alkynyl group. R$_8$ is independently a non-metallic substituent; and u is 0, 1, 2, 3 or 4. At least one of R$_1$–R$_8$ must be an ionizable group capable of imparting water solubility to the dye. Preferably R$_8$ represents one or more ionizable groups, some examples of which are: carboxy, sulfoxy, or hydroxy, and the group may be protonated or present in its ionized form as a salt, and associated with any positive counterion.

The following examples are intended to illustrate, but not to limit, the present invention.

EXAMPLES

Preparation of Inventive dye I-1

With stirring, sodium nitrite (3.0 g, 0.043 mol) was added to 28 mL of precooled sulfuric acid in a medium sized beaker. The mixture was heated to 60–65° C. until all solid was dissolved. It was then placed back in an ice water bath and cooled to 15° C. To it was added 28 mL of a mixture of 1 part propionic acid and 5 parts acetic acid. The temperature rose to 30° C., and the mixture was stirred for 20 minutes until the temperature was <10° C. To the nitrosyl sulfuric acid mixture was added a slurry of finely ground pyrazole 1 (14.47 g., 0.036 mol.) in 72 mL of propionic acid. The mixture thickened and became a yellow-brown color. It was stirred a total of 2 hrs in an ice bath at 10° C. Meanwhile, coupler 2 (6.39 g, 0.03 mol) was dissolved in 60 mL of 3M aqueous NaOH, and 60 mL water, with a little mtethanol to get complete dissolution, and cooled in ice with stirring. To the cooled, stirred coupler solution was added the diazonuim solution in one portion. An immediate yellow color formed and the temperature rose to 25° C. then fell back to 10° C. The mixture was stirred for 15 min. in the ice bath and 30 min at room temperature. The pH was still highly acidic. To it was added saturated aqueous NaCl solution and the mixture was shaken in a separatory funnel with approx. 2:1 tetrahydrofuran:ethyl acetate. The aqueous layer was extracted with an additional portion of tetrahydrofuran and the organic layers were combined and concentrated. Residual water was removed by azeotropic distillation with acetonitrile under vacuum (rotovap). The resulting orange solid was dissolved in aqueous sodium bicarbonate, and extracted 3× with ethyl acetate to remove some neutral impurities. The aqueous portion was carefully brought to pH 1 with conc. aq. HCl, and extracted with 3 portions of tetrahydrofuran:ethyl acetate. These organic phases were combined, stripped, and azeotroped dry as before. The crude orange solid was dissolved in hot acetonitrile with a few drops of ethanol, and filtered hot to remove salts. It was cooled, then diluted further with acetonitrile and ether, collected by filtration, and dried overnight in a vacuum oven

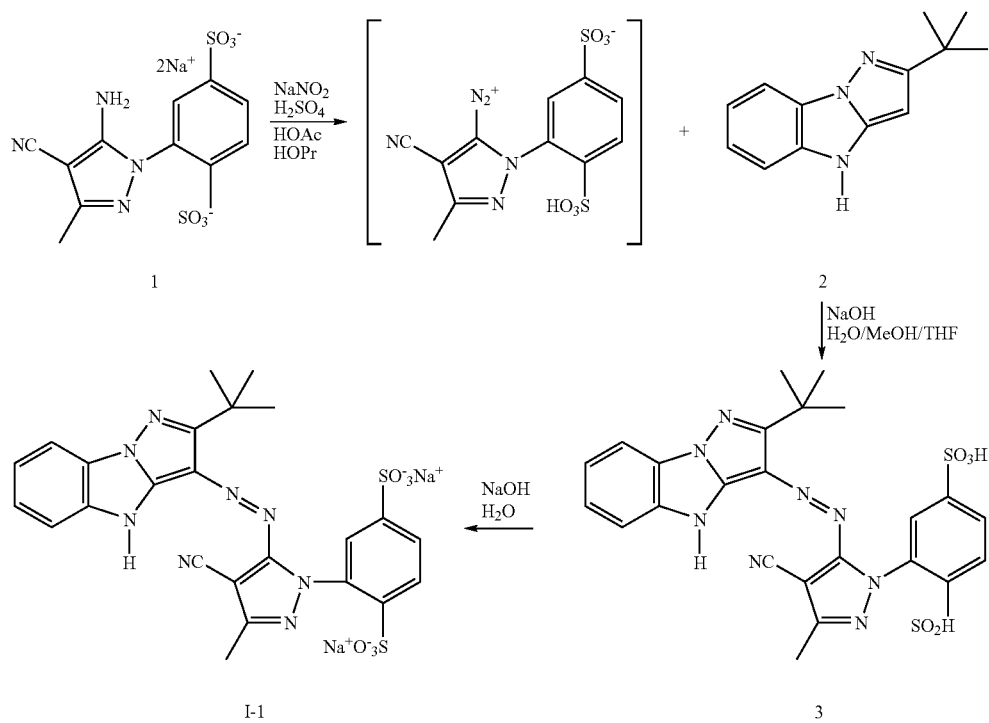

at 40° C. to provide 9.25 g dye 3. It was placed in a round bottom flask, and to it was added an aqueous solution of 2 equivalents of NaOH in water. The water was removed by lypholization and the resulting powdery solid (52% yield) was 100 A % by reverse phase HPLC. NMR and Mass spectra were consistent with the desired structure.

Testing of Dyes in Standard Inkjet Ink Formulation Using Standard Inkjet Printer Preparation of inks.

Initial evaluation of dye properties was done using inks designed to give a maximum density of approximately 1.0, when printed onto Inkjet receivers using a Lexmark Z51®, thermal head printer. The formulations below achieved this. The concentration of dye in the formulation could be manipulated to achieve other levels of coverage. Inks containing the dyes employed in the invention and control dyes were prepared by dissolving an appropriate amount of the dye in deionized water containing humectants. These consisted of tetraethylene glycol (15 wt. %), 2-pyrrolidinone (8 wt. %) 1,2 hexanediol (3.5 wt. %), and a surfactant, Surfynol 465® (Air Products Co.) at 0.5 wt. %. Details are given in the Table below.

Printing of test images.

The above inks were then filtered through a 0.45µ polytetrafluoroethylene filter and placed in a clean Lexmark ink cartridge, which was then fitted into the color ink station of the Lexmark Z51® printer. Various test targets were printed, using a variety of inkjet receivers, to allow examination of several density levels ranging from 100% dot coverage to less than 25% dot coverage. After drying for 24 hours at ambient temperature and humidity, printed samples were subjected to image stability testing under a variety of conditions. These tests are described below. Typically the Status A blue density of the 100% dot coverage (or other) patch was recorded from a fresh sample using an X-Rite@820 densitometer. The sample was subjected to incubation and then re-read. The percentage of dye density remaining relative to the fresh sample was calculated, to give a measure of dye stability on a particular receiver.

Atmospheric Contaminants Test:

1. High Intensity

Printed samples were hung in a darkened chamber maintained at room temperature and with a constant atmosphere containing 5 ppm of Ozone, and at a relative humidity of approximately 50%. The samples were removed after one day for density measurements.

2. Low Intensity

Printed samples were hung in a room simulating an office environment for light (lit with domestic fluorescent light), temperature (maintained at room temperature) and humidity, but with a constant atmosphere containing 60 ppb of Ozone. The samples were removed after 2 weeks for density measurements.

High Intensity Simulated Daylight Fading Test:

Samples were mounted in a chamber where they were subjected to 50 Klux light exposure from a xenon source for a given period of time, and the percentage of dye remaining was calculated.

The following data show that inks containing the dyes employed in the invention yield more light stable images than closely related analogs.

TABLE 2

Retained dye as a percentage of original density.

| Dyes | Ink | Wt % dye In test ink | Tests | % density retained swellable medium | % density retained Porous medium |
|---|---|---|---|---|---|
| I-1 | II-1 | | HI Daylight fade | 99 | 96 |
| | | | HI Ozone fade | 99 | 83 |
| | | | LI Ozone fade | 100 | 94 |
| I-3 | II-2 | | HI Daylight fade | 95 | 97 |
| | | | HI Ozone fade | 100 | 93 |
| | | | LI Ozone fade | 100 | 97 |
| I-4 | II-3 | | HI Daylight fade | 97 | 89 |
| | | | HI Ozone fade | 100 | 70 |
| | | | LI Ozone fade | 100 | 84 |
| I-5 | II-4 | | HI Daylight fade | 100 | 96 |
| | | | HI Ozone fade | 99 | 91 |
| | | | LI Ozone fade | 99 | 96 |
| I-6 | II-5 | | HI Daylight fade | 99 | 90 |
| | | | HI Ozone fade | 99 | 74 |
| | | | LI Ozone fade | 100 | 89 |
| I-7 | II-6 | | HI Daylight fade | 89 | 94 |
| | | | HI Ozone fade | 99 | 90 |
| | | | LI Ozone fade | 99 | 96 |
| I-8 | II-7 | | HI Daylight fade | 95 | 96 |
| | | | HI Ozone fade | 100 | 96 |
| | | | LI Ozone fade | 99 | 98 |
| I-38 | II-8 | | HI Daylight fade | 92 | 97 |
| | | | HI Ozone fade | 100 | 97 |
| | | | LI Ozone fade | 100 | 98 |
| I-39 | II-9 | | HI Daylight fade | 100 | 91 |
| | | | HI Ozone fade | 100 | 78 |
| | | | LI Ozone fade | 100 | 91 |
| C-I | C-1 | | HI Daylight fade | 93 | 72 |
| | | | HI Ozone fade | 100 | 85 |
| | | | LI Ozone fade | 97 | 80 |
| C-2 | C-2 | | HI Daylight fade | 7 | 4 |
| | | | HI Ozone fade | 94 | 15 |
| | | | LI Ozone fade | 93 | 40 |

HI daylight = 50 Klux lamp for two weeks.
HI ozone = 5 ppm ozone concentration for 24 hrs.
LI ozone = 60 ppb ozone concentration for two weeks.

Comparative Compounds

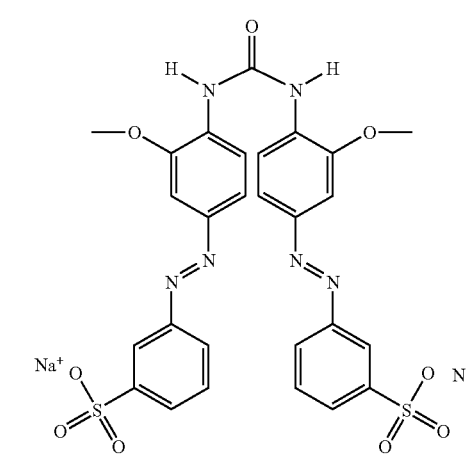

C-1

-continued

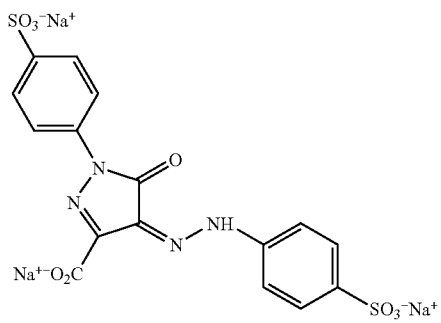

C-2

The invention has been described in detail with particular reference to certain preferred embodiments thereof, but it will be understood that variations and modifications can be effected within the spirit and scope of the invention.

What is claimed is:

1. An ink composition comprising a dye represented by Formula I:

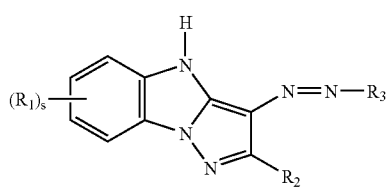

I wherein
$R_1$ is independently a non-metallic substituent;
s is 0, 1, 2, 3, or 4;
$R_2$ is hydrogen or a non-metallic substituent;
$R_3$ is a substituted or unsubstituted aromatic or heterocyclic group with the proviso that if $R_3$ is a quinoline moiety, the azo group is not bonded to the 5,6,7 or 8 position of the quinoline ring; wherein the dye must bear at least one ionizable group that is capable of imparting water solubility to the dye.

2. The ink composition of claim 1 wherein $R_3$ is a substituted or unsubstituted aromatic carbocyclic group or heterocyclic group, in which the azo group is bonded to a ring that contains at least one heteroatom.

3. The ink of claim 1 wherein $R_3$ is:

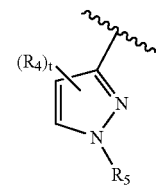 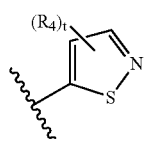 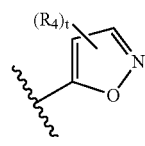

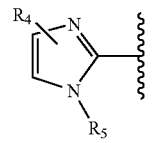 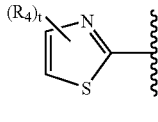 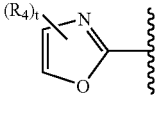

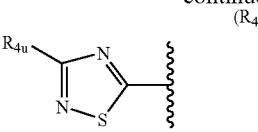

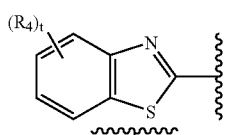

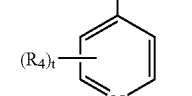

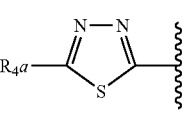

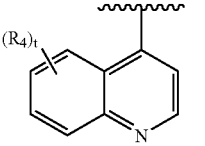

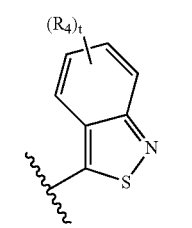

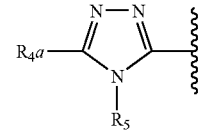

or wherein
$R_4$ is independently a non-metallic substituent;
t is 0, 1, 2, 3 or 4;
$R_{4a}$ is hydrogen or a non-metallic substituent; and
$R_5$ is a hydrogen atom, a substituted or unsubstituted aryl, alkenyl, alkynyl or alkyl group, a sulfo group, a carboxyl or carboalkoxy group, a formyl group or a substituted acyl group; and the point of attachment to the nitrogen of the azo
group is designated by:

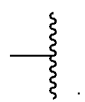

4. The ink composition of claim 1 in which $R_1$ is independently a halogen atom, a cyano group, a substituted or unsubstituted alkyl group, an alkoxy group, an aryloxy group, a primary, secondary or tertiary amino or amido group, an aromatic amino group, an acyloxy group, a cycloalkyl group, an alkenyl group, an aralkyl group, a substituted or unsubstituted aryl group, a carboxyl or substituted carboxyl group, an alkylthio group, an arylthio group, an acyl group, a substituted acyl group, a carbamoyl group, a nitro group, an alkyl or aryl sulfone, a sulfonic acid, a sulfonate group, a substituted or unsubstituted primary or secondary alkyl sulfonamide, a substituted or unsubstituted aryl sulfonamide, a sulfamoyl group, a secondary or tertiary amine or a heterocyclic group; and $R_2$ is independently a hydrogen atom or a halogen atom, a cyano group, a substituted or unsubstituted alkyl group, an alkoxy group, an aryloxy group, a primary, secondary or tertiary amino or amido group, an aromatic amino group, an acyloxy group, a cycloalkyl group, an alkenyl group, an aralkyl group, a substituted or unsubstituted aryl group, a carboxyl or substituted carboxyl group, an alkylthio group, an arylthio group, an acyl group, a substituted acyl group, a carbamoyl group, a nitro group, an alkyl or aryl sulfone, a sulfonic acid, a sulfonate group, a substituted or unsubstituted primary or secondary alkyl sulfonamide, a substituted or unsubstituted aryl sulfonamide, a sulfamoyl group, a secondary or tertiary amine or a heterocyclic group.

5. The ink composition of claim 3 in which $R_1$ is independently a halogen atom, a cyano group, a substituted or unsubstituted alkyl group, an alkoxy group, an aryloxy group, a primary, secondary or tertiary amino or amido group, an aromatic amino group, an acyloxy group, a cycloalkyl group, an alkenyl group, an aralkyl group, a substituted or unsubstituted aryl group, a carboxyl or substituted carboxyl group, an alkylthio group, an arylthio group, an acyl group, a substituted acyl group, a carbamoyl group, a nitro group, an alkyl or aryl sulfone, a sulfonic acid, a sulfonate group, a substituted or unsubstituted primary or secondary alkyl sulfonamide, a substituted or unsubstituted aryl sulfonamide, a sulfamoyl group, a secondary or tertiary amine or a heterocyclic group; and $R_2$ is independently a hydrogen atom or a halogen atom, a cyano group, a substituted or unsubstituted alkyl group, an alkoxy group, an aryloxy group, a primary, secondary or tertiary amino or amido group, an aromatic amino group, an acyloxy group, a cycloalkyl group, an alkenyl group, an aralkyl group, a substituted or unsubstituted aryl group, a carboxyl or substituted carboxyl group, an alkylthio group, an arylthio group, an acyl group, a substituted acyl group, a carbamoyl group, a nitro group, an alkyl or aryl sulfone, a sulfonic acid, a sulfonate group, a substituted or unsubstituted primary or secondary alkyl sulfonamide, a substituted or unsubstituted aryl sulfonamide, a sulfamoyl group, a secondary or tertiary amine or a heterocyclic group.

6. The ink composition of claim 1 wherein said dye has adequate water solubility to enable preparation of an ink formulation containing between 0.2% and 10% dye.

7. The ink composition of claim 3 wherein said dye has adequate water solubility to enable preparation of an ink formulation containing between 0.2% and 10% dye.

8. The ink composition of claim 1 wherein the dye is represented by Formula II:

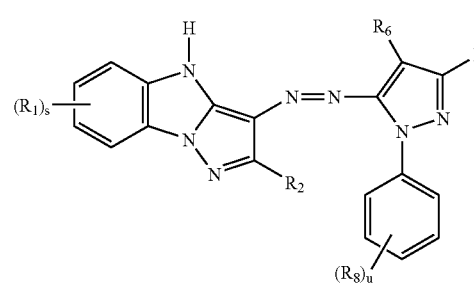

wherein
$R_6$ and $R_7$ are independently a hydrogen atom or any non-metallic group;
$R_8$ is independently a non-metallic substituent, u is 0, 1, 2, 3 or 4; with the proviso that at least one of $R_1$–$R_8$ must be an ionizable group capable of imparting water solubility to the dye.

9. The ink composition of claim 8 wherein $R_6$ is a carboxyl, nitro, halogen, sulfonyl, sulfo, acyl, substituted acyl, cyano, or a heterocyclic group.

10. The ink composition of claim 8 wherein $R_7$ is a hydrogen atom, or a substituted or unsubstituted alkyl, aryl, alkenyl or alkynyl group.

11. The ink composition of claim 8 wherein $R_8$ is an ionizable group.

12. The ink composition of claim 8 wherein $R_6$ is a carboxyl, nitro, halogen, sulfonyl, sulfo, acyl, substituted acyl, cyano, or a heterocyclic group; $R_7$ is a hydrogen atom, or a substituted or unsubstituted alkyl, aryl, alkenyl or alkynyl group; and $R_8$ is an ionizable group.

13. A dye represented by Formula I:

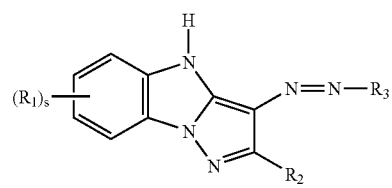

wherein
$R_1$ is independently a non-metallic substituent;
s is 0, 1, 2, 3, or 4;
$R_2$ is hydrogen or a non-metallic substituent;
$R_3$ is

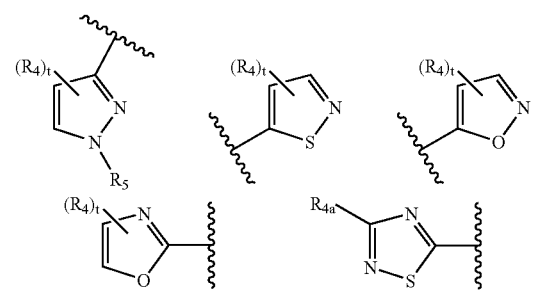

-continued

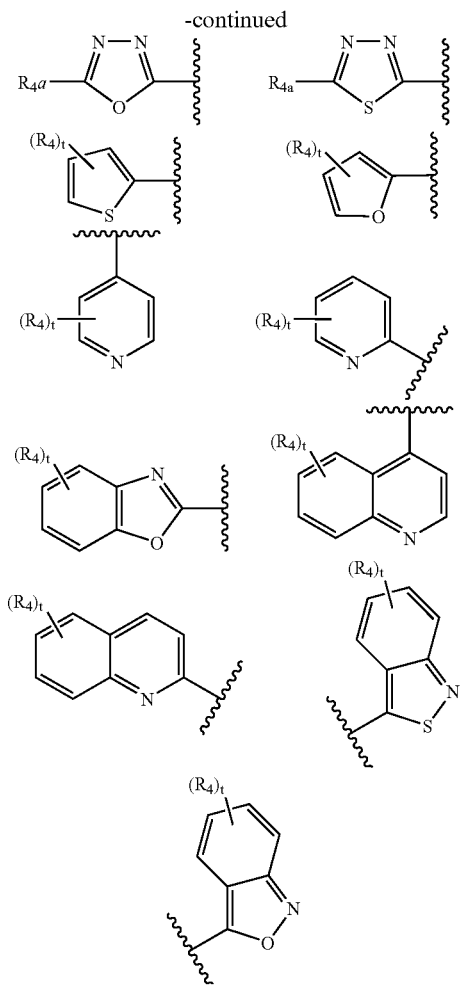

or
- $R_4$ is independently a non-metallic substituent;
- t is 0, 1, 2, 3 or 4;
- $R_{4a}$ is hydrogen or a non-metallic substituent; and
- $R_5$ is a hydrogen atom, a substituted or unsubstituted aryl, alkenyl, alkynyl or alkyl group, a sulfo group, a carboxyl or carboalkoxy group, a formyl group or a substituted acyl group; and the point of attachment to the nitrogen of the azo group is designated by:

with the proviso that the dye must bear at least one ionizable group that is capable of imparting water solubility.

14. The dye of claim 13 represented by Formula IA:

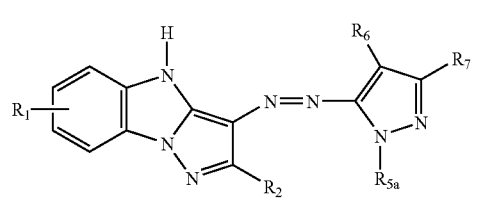

wherein
- $R_{5a}$ is a hydrogen atom, a substituted or unsubstituted aryl, alkenyl, alkynyl or alkyl group, a sulfo group, a carboxyl or carboalkoxy group, a formyl group or a substituted acyl group; and
- $R_6$ and $R_7$ are independently a hydrogen atom or any non-metallic substituent; with the proviso that at least one of $R_1$, $R_2$, $R_{5a}$, $R_6$ and $R_7$ must be an ionizable group capable of imparting water solubility to the dye.

15. The dye of claim 14 represented by Formula II:

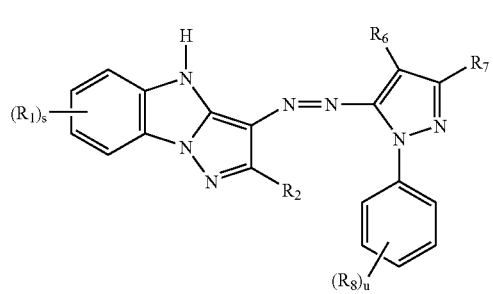

wherein
- $R_1$ is independently a non-metallic substituent;
- s is 0, 1, 2, 3 or 4;
- $R_6$ is a carboxyl, nitro, halogen, sulfonyl, sulfo, acyl, substituted acyl, cyano, or a heterocyclic group; $R_7$ is a substituted or unsubstituted alkyl, aryl, alkenyl or alkynyl group; and $R_8$ is independently a non-metallic substituent; and
- u is 0, 1, 2, 3 or 4; with the proviso that at least one of $R_1$, $R_2$, $R_6$, $R_7$ and $R_8$ must be an ionizable group capable of imparting water solubility to the dye.

16. The dye of claim 15 wherein $R_8$ represents one or more ionizable groups.

* * * * *